(12) United States Patent
Singh et al.

(10) Patent No.: US 11,238,044 B2
(45) Date of Patent: Feb. 1, 2022

(54) CANDIDATE DATA RECORD PRIORITIZATION FOR MATCH PROCESSING

(71) Applicant: INTERNATIONAL BUSINESS MACHINES CORPORATION, Armonk, NY (US)

(72) Inventors: Neeraj R. Singh, Bangalore (IN); Soma Shekar Naganna, Bangalore (IN); Shettigar Parkala Srinivas, Bangalore (IN); Scott Schumacher, Porter Ranch, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 187 days.

(21) Appl. No.: 16/403,945

(22) Filed: May 6, 2019

(65) Prior Publication Data
US 2020/0356564 A1 Nov. 12, 2020

(51) Int. Cl.
*G06F 16/2453* (2019.01)
*G06F 16/906* (2019.01)
*G06N 20/00* (2019.01)

(52) U.S. Cl.
CPC ...... *G06F 16/24549* (2019.01); *G06F 16/906* (2019.01)

(58) Field of Classification Search
CPC .................. G06F 16/24549; G06F 16/906
USPC ....................................................... 707/688
See application file for complete search history.

(56) References Cited

U.S. PATENT DOCUMENTS

| 5,852,820 A | 12/1998 | Burrows |
| 6,907,422 B1 | 6/2005 | Predovic |
| 10,114,846 B1 | 10/2018 | Shah et al. |
| 10,866,996 B2* | 12/2020 | Pogrebezky .......... G06F 16/951 |
| 2007/0299842 A1* | 12/2007 | Morris ................. G06F 16/355 |

(Continued)

OTHER PUBLICATIONS

Well, Peter, et al., "The NIST Definition of Cloud Computing", NIST Special Publication 800-145, Sep. 2011, Gaithersburg, MD, 7 pgs.

*Primary Examiner* — Pierre M Vital
*Assistant Examiner* — Alicia M Antoine
(74) *Attorney, Agent, or Firm* — William Hartwell; Matthew M. Hulihan; Heslin Rothenberg Farley & Mesiti PC

(57) ABSTRACT

Candidate data record prioritization for match processing includes identifying candidate records for use in match processing to determine records that match to an incoming record. The candidates are grouped into buckets according to bucket roles, with each bucket correlating to a bucket role, and with each bucket role being defined by a unique record attribute set. The method obtains an effectiveness score for each of the bucket roles. The scores are measures of effectiveness of the bucket roles in identifying candidates that match to incoming data records. The method establishes an order of priority in which to process the candidates by prioritizing the buckets into an order based on the effectiveness scores for the bucket roles. The process then commences match processing to process the candidates in the established order of priority where the match processing processes candidates of a higher priority bucket before processing candidates of lower priority buckets.

20 Claims, 8 Drawing Sheets

(56) References Cited

U.S. PATENT DOCUMENTS

| | | | |
|---|---|---|---|
| 2008/0215546 A1 | 9/2008 | Baum et al. | |
| 2008/0243885 A1* | 10/2008 | Harger | G06F 16/21 |
| 2011/0010401 A1* | 1/2011 | Adams | G06F 16/221 |
| | | | 707/805 |
| 2015/0066951 A1 | 3/2015 | Natarajan et al. | |
| 2018/0089188 A1 | 3/2018 | Kharisma et al. | |
| 2018/0113888 A1* | 4/2018 | Pena Munoz | G06F 16/215 |
| 2019/0005430 A1 | 1/2019 | Boyacigiller et al. | |
| 2019/0018896 A1 | 1/2019 | Andhavarapu et al. | |
| 2020/0026717 A1* | 1/2020 | Appukutty | G06F 16/2457 |
| 2020/0372435 A1* | 11/2020 | Kenthapadi | G06N 20/00 |

* cited by examiner

| Data Field | Bucket Role | Data | Bucket Hash | Number of Candidates | Number of Matches | Time Spent in Matching (ms) |
|---|---|---|---|---|---|---|
| Name | BR1 | Neeraj | 9988776655 | 200 | 2 | 2000 |
| Phone number | BR2 | 123-456-789 | 1122334455 | 10 | 2 | 100 |
| Date of Birth | BR3 | 01/02/1975 | 4433221100 | 490 | 1 | 4900 |
| Address | Not Used | #001, Street 234, Bangalore, India | - | - | - | - |

FIG. 2A

| | Candidate List | | Candidates | Matches Detected | Time Taken (ms) |
|---|---|---|---|---|---|
| case1 | C001 ... C100 ... C200 C201 ... C210 C211 ... C700 | | 700 | 5 | 7000 |
| case2 | C001 ... C101 ... C210 C211 ... C700 | | 100 | 0 to 2 | 1000 |

FIG. 2B

| Data Field | Bucket Role | Data | Bucket Hash | Number of Candidates | Number of Matches | Time Spent in Matching (ms) | Match per Candidate | Sum of Scores for Matched Parties |
|---|---|---|---|---|---|---|---|---|
| Name | BR1 | Neeraj | 9988776655 | 200 | 2 | 2000 | 1.0% | 250 |
| Phone number | BR2 | 123-456-789 | 1122334455 | 10 | 2 | 100 | 20.0% | 300 |
| Date of Birth | BR3 | 01/02/1975 | 4433221100 | 490 | 1 | 4900 | 0.2% | 120 |
| Address | Not Used | #001, Street 234, Bangalore, India | - | - | - | | | |

FIG. 3A

| | Candidate List | | | | | | Candidates | Potential Matches Detected | Time Taken (ms) |
|---|---|---|---|---|---|---|---|---|---|
| case3 | C201 C210 ... | C001 C090 | C091 | C200 | C211 | C700 | 100 | 2 to 4 | 1000 |

FIG. 3B

CANDIDATE DATA RECORD PRIORITIZATION FOR MATCH PROCESSING

BACKGROUND

Master Data Management (MDM) solutions commonly offer data record matching and linking capability. Matching refers to processing that compares a subject data record to one or more candidate data records to determine which candidates, if any, match to the subject data record. 'Match' in this sense often means that the records represent or correlate to a common entity though the records may not necessarily include the exact same data. Match processing is commonly used to identify duplicate records to be linked together or merged, in which data of the records are consolidated into a master record. Since finding duplicates in a given population can require a prohibitively large number of comparisons, indexing approaches are used to select a set of candidate records via a selection process and therefore limit the number of comparisons to be performed. Reducing the number of comparisons can reduce match processing time but the success of the matching capability is highly dependent on the accuracy of the candidate selection process.

SUMMARY

Shortcomings of the prior art are overcome and additional advantages are provided through the provision of a computer-implemented method. The method includes identifying, from a dataset, candidate data records to be used in match processing. The match processing is to determine data records that match to an incoming data record. The identified candidate data records are grouped into buckets according to bucket roles, where each bucket correlates to a bucket role of the bucket roles, and where each bucket role of the bucket roles is defined by a unique record attribute set. The method also obtains effectiveness scores for the bucket roles. The effectiveness scores are measures of effectiveness of the bucket roles in identifying candidate data records that match to incoming data records. The method establishes an order of priority in which to process the candidate data records in the match processing. Establishing the order of priority includes prioritizing the buckets into an order based on the effectiveness scores for the bucket roles, where the buckets are prioritized in an order of descending effectiveness of their correlated bucket roles. The method also commences the match processing to process the candidate data records in the established order of priority for processing the candidate data records, in which the match processing processes candidate data records of a higher priority bucket before processing candidate data records of a lower priority bucket.

Further, a computer system is provided that includes a memory and a processor in communication with the memory, wherein the computer system is configured to perform a method. The method includes identifying, from a dataset, candidate data records to be used in match processing. The match processing is to determine data records that match to an incoming data record. The identified candidate data records are grouped into buckets according to bucket roles, where each bucket correlates to a bucket role of the bucket roles, and where each bucket role of the bucket roles is defined by a unique record attribute set. The method also obtains effectiveness scores for the bucket roles. The effectiveness scores are measures of effectiveness of the bucket roles in identifying candidate data records that match to incoming data records. The method establishes an order of priority in which to process the candidate data records in the match processing. Establishing the order of priority includes prioritizing the buckets into an order based on the effectiveness scores for the bucket roles, where the buckets are prioritized in an order of descending effectiveness of their correlated bucket roles. The method also commences the match processing to process the candidate data records in the established order of priority for processing the candidate data records, in which the match processing processes candidate data records of a higher priority bucket before processing candidate data records of a lower priority bucket.

Yet further, a computer program product including a computer readable storage medium readable by a processing circuit and storing instructions for execution by the processing circuit is provided for performing a method. The method includes identifying, from a dataset, candidate data records to be used in match processing. The match processing is to determine data records that match to an incoming data record. The identified candidate data records are grouped into buckets according to bucket roles, where each bucket correlates to a bucket role of the bucket roles, and where each bucket role of the bucket roles is defined by a unique record attribute set. The method also obtains effectiveness scores for the bucket roles. The effectiveness scores are measures of effectiveness of the bucket roles in identifying candidate data records that match to incoming data records. The method establishes an order of priority in which to process the candidate data records in the match processing. Establishing the order of priority includes prioritizing the buckets into an order based on the effectiveness scores for the bucket roles, where the buckets are prioritized in an order of descending effectiveness of their correlated bucket roles. The method also commences the match processing to process the candidate data records in the established order of priority for processing the candidate data records, in which the match processing processes candidate data records of a higher priority bucket before processing candidate data records of a lower priority bucket.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 2A-2B depict example results for candidate selection and match processing of an incoming data record;

FIGS. 3A-3B depict example results for candidate selection and match processing of the incoming data record of FIG. 2A using candidate prioritization in accordance with aspects described herein;

DETAILED DESCRIPTION

Figure 1:
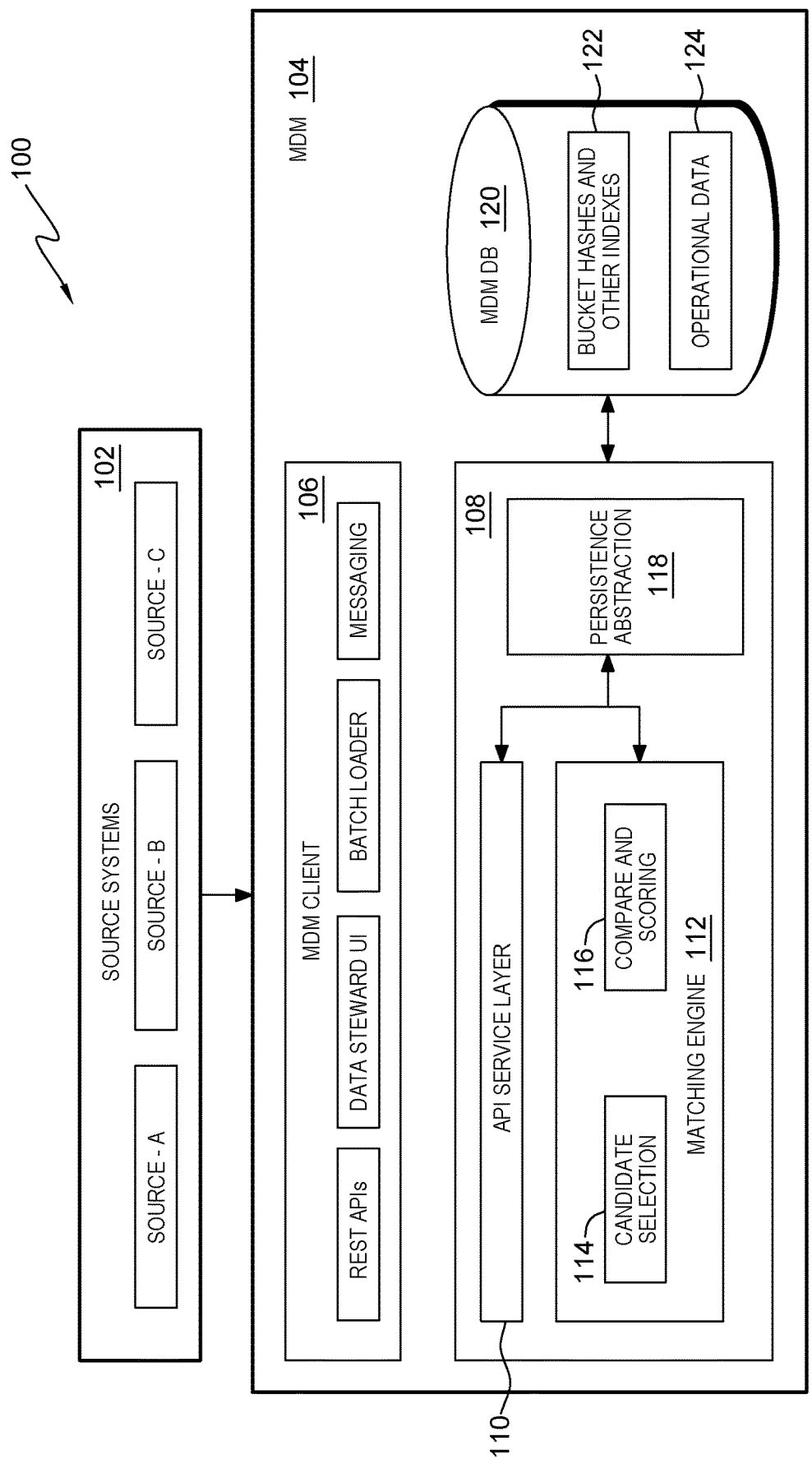
FIG. 1 depicts an example Master Data Management environment.

Described herein are approaches for prioritizing candidate data records to be processed in a matching technique to match an incoming data record to existing records of a dataset. Datasets/databases store data records (also referred to herein as "records) that can number in the millions. It may be desired to identify records of the dataset that match to an incoming data record, for instance one provided in an 'add data record', 'update data record', or 'search for data record' request made to a master data management (MDM) system. While one approach is to compare the incoming record with each record stored in the dataset, this is impractical for large datasets. Instead, a subset of records from that dataset is selected as candidate data records ("candidates") that may or may not actually match to the incoming data record. Candidates are selected from the dataset of data records for comparison to the incoming data record. Candidate selection is not random. It typically uses rules that dictate which data records, of the larger dataset, are be selected as the candidates for match processing. Candidates are then processed one-by-one to determine whether they match to the incoming record. The rules for candidate selection may be defined during the initial phases of implementation of the MDM. Part of candidate selection is the identification of attributes, or groups thereof, that are to serve as the basis for candidate selection. For instance, in the context of a global address book in which data records represent individuals, an attribute may be a 'Last Name' attribute of data records. A designer or implementer of an MDM matching facility makes choices about the attribute(s) of the incoming record that are to form the basis for candidate selection. The choices made dictate the indexes, or 'blocking indexes', used to identify which records are considered candidates.

By way of example, assume that an incoming data record is for an individual and the record has First Name, Last Name, and Phone Number record attributes (also referred to herein as "attributes"). The database into which this record is to be, e.g., added, merged, etc., includes a set of data records for individuals. Typically, though not always, each record attribute would be a column name of the database of records. Candidate selection may be based (at least in part) on the Phone Number attribute, in which records from the database that have some commonality in the data of their Phone Number attribute to the data of the Phone Number attribute of the incoming data record are conceptually placed into a "bucket". The commonality between the two records may be based on a matching hash of data for the attribute(s), e.g. a hash of their phone numbers, for instance. The Phone Number attribute therefore defines a "bucket role". Candidate selection may ultimately be based on one or more bucket roles, and each bucket role may be defined by one or more record attributes.

Indexes that help identify records in a database are created on columns or column groups. Since each column in the database typically correlates to a respective attribute, and a bucket role can be defined by an attribute set (one or more attributes), a bucket role can be considered to be defined by a column or set of columns on which the indexes have been created.

An index for a given data record could be a modified version of the record's data for the column(s) on which the index is created. Using the Phone Number attribute as an example, it may not be desired to use the phone number of the record as its index because of security or practical reasons; instead, it may be desired to sort the digits of the record's phone number in ascending order to look like another number. The index could be this modified number of some other value computationally derived therefrom, for instance a hash of that number. The 'bucket role' in this example is the Phone Number attribute, while the actual index, sometimes referred to as a "blocking index", is a processed version of the data for that attribute (i.e. the sorted phone number for the individual represented by the record).

Accordingly, an indexing technique for a candidate selection process can proceed by identifying one or more bucket roles and then hashing data of data records according to those roles in order to create the indexes. Blocks of data that share the same hash are considered candidates for the match processing and part of a common bucket correlating to the bucket role producing that hash.

Continuing with the example above, assume that several individuals (represented by their data records) are to be organized into buckets. The record attributes (e.g. column names) in the database include Phone Number, First Name, Last Name, Street Address, Town, State, ZIP code, Email Address, and Company Name. It may not be required for each data record in the database to include data for each and every attribute.

Example bucket roles include a first bucket role (BR1) of 'Last Name', a second bucket role (BR2) of 'Email Address', and a third bucket role (BR3) of a 'combination of the Street Address and ZIP code attributes'. Basic example hashes for bucket roles BR1, BR2 and BR3 could be, respectively: [first three letters of last name], [email address domain], and [a concatenation of house number from the record's Street Address attribute and ZIP code attribute].

Assume an incoming data record for person A is to be matched to existing records in the database and that the incoming record includes data for the First Name, Last Name, Street Address and ZIP code attributes as follows: {First Name=John; Last Name=Smith; Street Address=123 Nowhere St.; ZIP code=12345}. The bucket roles selected for candidate selection may be BR1 and BR3 but not BR2 because there is no email address in the incoming record. A first bucket, for BR1, would include data records for individuals whose last name as indicated by the data records begins with "Smi", and a second bucket, for BR3, would include data records for individuals whose concatenated house number and ZIP code are "12312345". Any record included in any one or more buckets would be selected as a candidate. It is noted that a given candidate may be included in more than one bucket.

Accordingly, a bucket is a set of candidate record(s), and if more than one bucket role is used for candidate selection, then more than one such set may make up the overall set of candidates against which the incoming data record is to be matched. Each bucket of candidates correlates to one bucket role of the bucket role(s) serving as the basis for candidate selection. Each bucket role is defined by a unique record attribute set (one or more attributes), i.e. whichever record attribute(s) are used to define a commonality.

Continuing further with the above example, if there are three bucket roles and data in the incoming record for each of the underlying record attributes defining those roles, then three hashes would be presented for the incoming record. The dataset would be queried for all records for which any one or more of these hashes were produced. A match in a hash of the incoming record to a hash of an existing record represents commonality between the records on at least one data point. The result of the query is the full set of candidates for matching. At that point, the process could fetch the data of each data record, or at least all of the critical data used for matching, for instance first and last names, street address, email address, etc. Any desired matching algorithm could be used to determine whether a candidate is a match to the incoming data record. Conventionally, each of the candidates would pass through that matching algorithm to produce a respective score for that record. Every candidate record is scored and a threshold is applied to identify which record(s) actually match to the incoming record. The incoming record and those existing records could be auto-merged into a master, for instance. As one example, the threshold specifies a number n, where the matches are the n number of records having the highest degree of matching to the incoming record. As another example, the threshold specifies a given match score and all records with at least that match score are considered matched.

In conventional approaches, designers or implementers use only a qualitative assessment, based on their own experience, in making a decision about the selection of bucket roles. Match processing then processes the incoming record against each of the candidates. But it can be difficult to quantify the effectiveness of the choices made. The list of candidates generated by these rules is a "flat" list without any order of priority. This makes it difficult to achieve, at runtime, a balance of quality and performance, should this list grow beyond manageable sizes for a given record population.

Aspects described herein provide optimizations that balance performance and quality. Specifically, bucket roles are prioritized based on their effectiveness at identifying candidate records that match to incoming records. This provides an opportunity to evaluate only a subset of the candidate records instead of all candidate records. The prioritization prioritizes the candidates such that the candidates first to be processed are statistically more likely to match to the incoming record than candidates later in the candidate pool. This provides the opportunity to define an early-exit to the match processing. An administrator or other user can set performance constraint(s) that strike a balance between performance and quality. For instance, a constraint might dictate a maximum allowable runtime of the match processing, a number of records to process before exiting, or that only results in highest priority k bucket(s) are to be processed, as examples. A user desiring faster performance at the expense of quality could set a constraint that forces an earlier exit after processing fewer records. Additionally or alternatively, a threshold could be defined based on frequency of matching or match scores of the matching candidates as the match processing proceeds. For instance, if match scores (degree of match) between the incoming record and matching candidate records decreases as match processing progresses, the threshold could dictate an early exist once a match score below a threshold value is obtained, or when a downward trend or abrupt decrease in match scores is observed, as examples.

Aspects described herein provide ways to quantify the effectiveness of bucket-roles, weight bucket roles to prioritize the list of candidates, and enable a balance of performance and quality in matching by way of an early-exit while match scoring. Weights can be used to evaluate effectiveness of candidate selection rules and provide guidance when creating new sets of rules. An effectiveness score for a bucket role can define a weight of a bucket of candidates that correlates to that bucket role having that effectiveness score (i.e. the bucket produced by identifying the records with the hash produced by the bucket role). The set of buckets having candidate(s) for match processing may be prioritized in an order, for instance in order of descending weight of those buckets. Meanwhile, tracking effectiveness can inform recommendations about bucket role design and use.

In another aspect, machine learning recognizes patterns and recommends weights for the bucket roles and/or obtains indications of bucket role effectiveness and uses this to self-manage buckets. Bucket roles can be suggested for removal, and effectiveness can be monitored over time in order to eliminate or replace roles automatically, or add new roles. The machine learning can learn which record attributes contribute most positively to a bucket role's effectiveness in identifying candidate data records that match to incoming data records, then, e.g. suggest these attributes for possible definition of new bucket roles to be part of that collection.

In yet another aspect, match processing can be expedited by adding automatic parallelism. The parallelism could split a prioritized candidate pool into multiple pools that are concurrently processed. Match results from the concurrent processing could then be merged into a resulting pool that is either taken as the matching records or is again subject to match processing, perhaps with a different matching algorithm applied, i.e. one having a higher threshold for deeming records as matching.

FIG. 1 depicts an example Master Data Management environment 100, in which match processing may be performed. Master data management refers to the management and maintenance of records that are considered most important (master data). This concept is important for business with multiple units that have their own individual databases of records, like a credit card division and a debit card division of a bank as an example.

Source systems 102 represent underlying data source systems with data records to be consolidated and merged in the MDM database 120. Source systems 102 feed their data to an MDM system 104, implemented as one or more computer systems, for instance. The MDM system 104 runs MDM clients 106 to receive data of data records from the source clients. Four example MDM clients—REST APIs, Data Steward UI, Batch Loader, and Messaging—are depicted in FIG. 1, though others are possible. MDM server 108 of the MDM system 104 exposes API services in an API services layer 110 for the clients 106 to feed the record data into the MDM server 108. Incoming record data received by server 108 passes through candidate selection 114 and comparing and scoring 116 functions in matching engine 112, in which candidates are selected and match processing is performed. The final decision as to the master data is made by persistence abstraction component 118. The master data is then persisted into the MDM database 120. Operational data 124 of MDM DB 120 refers to the dataset—the actual data records. Bucket hashes and other indices 122 are also maintained in the MDM DB 120.

In a sequence of events, an incoming add/update/search request is made to MDM system with an incoming record. Bucket hashes are created per bucket role(s) defined in the MDM system. Using these hashes, a set of candidates are selected from the database. The data considered critical for matching is also fetched for these candidates. In conventional practice, the incoming record is then compared against each candidate of the set of candidates using the fetched critical data. The candidates that score above a defined threshold are considered matches. It is this matching phase that typically contributes the most to the overall processing/resource consumption in matching and linking facilities of an MDM system. When the candidate list is large, it can take a significant amount of time, which is problematic.

Assume for simplicity that Name, Date of Birth, and Phone Number are used as bucket roles. In practice, bucket role definitions can be much more complex and involve combinations of data elements, considerations for phonetic equivalence, and other complexities.

For each incoming record with the above three data elements, the hashes for all 3 bucket roles above are determined. FIGS. 2A-2B depict example results for candidate selection and match processing of an incoming data record in this scenario. Referring initially to FIG. 2A, the depicted table includes a Data Field column indicating the Name, Phone number, Date of birth, and Address data fields/record attributes. The Bucket Role column indicates corresponding bucket roles BR1, BR2, and BR3 for Name, Phone Number, and Date of Birth, respectively. The Address data field is not used as a Bucket role. The Data column includes the data of the record for those data items, i.e. Name, Phone number, and Date of Birth for the individual represented by the incoming data record. The Bucket Hash column indicates the hash value of the corresponding Data for each of the three bucket roles, i.e. the hash of name "Neeraj", the hash of the phone number, and the hash of the date of birth. The Number of Candidates column indicates, for each given Bucket Role, the number of candidate data records of the dataset that have the same Bucket Hash for that Bucket Role. Thus, BR1 produces 200 candidates (with a hash of 998877665, i.e. matching the hash of the Neeraj Name) which are grouped into a first bucket, BR2 produces 10 candidates grouped into a second bucket, and BR3 produces 490 candidates grouped into a third bucket. Therefore, the process selects a total of 700 candidates in this example and the match process processes all 700 candidates.

The Number of Matches column indicates the respective number of data records from each bucket that match to the incoming data record. There are 5 total matches from the 700 candidates—2 matches from the first bucket (correlating to BR1), 2 matches from the second bucket (correlating to BR2), and 1 match from the third bucket (correlating to BR3). Lastly, the Time Spent in Matching (ms) column indicates the respective time spent by the system to process the records in each bucket. In this example, each record takes 10 ms to process for a total of 7000 ms to process all 700 candidate records.

If one desires to more quickly obtain a result while accepting a potential loss of quality due to missed matches, then this can be achieved by foregoing/skipping processing candidates over a ceiling number, such as 100. However, without guidance on which candidates to skip, the candidates to skip are essentially randomly chosen, leading to potentially poor match results.

Referring to FIG. 2B, results from two cases are presented. The row of case 1 mirrors FIG. 2A in which all 700 candidates are processed (the value indicated in the Candidates column for case 1), 5 matches are detected (the value indicated in the Matches Detected column for case 1), and runtime is 7000 ms (the value indicated in the Time Taken (ms) column for case 1). A Candidate List column in FIG. 2B graphically depicts an order in which candidates are processed during the match process. Here, candidates of bucket 202, the first bucket with 200 candidates C001-C200, are processed first, then the candidates of bucket 204, the second bucket with 10 candidates C201-C210, are processed next, and then the candidates of bucket 206, the third bucket with 490 candidates C211-C700, are processed last.

Case 2, presented in the row below case 1, represents a scenario where only the first 100 candidates (C001-C100) have been processed. Since the first bucket 202 includes 200 candidates, all of the 100 processed candidates in this scenario are from the first bucket 202. Portion 202a represents the first 100 candidates processed from the first bucket 202. The remaining portion, 202b, of bucket 202 is unprocessed, as are all candidates from buckets 204 and 206. While processing only the 100 candidates from the bucket saves time (1000 ms vs 7000 ms), the number of matches detected necessarily reduces from 5 to at least 0 and at most 2 (as two total matches were found in the entirety of bucket 202, see FIG. 2A).

By the results shown in FIG. 2A, prioritizing bucket 2 so that its candidates are processed first would ensure that processing only 100 candidates would provide at least 2 and potentially 4 matches (the 2 matches from BR2 and up to 2 matches from BR1) out of the 5 total matches in the entire candidate set. Prioritizing the candidates by bucket role and setting performance constraint(s) offers an opportunity to specify a balance between performance and quality. While processing only 100 candidates in the above example might miss one or more matches, results would be delivered faster.

There are various approaches for establishing an order of priority in which to process the candidate data records. In approaches described herein, the candidates are prioritized by placing the buckets in a desired order of processing. The buckets correlate directly to the bucket roles, therefore this is also a prioritization of the bucket roles. The objective of the prioritization can be to produce the greatest number of matches in the least number of comparisons.

In accordance with aspects described herein, a process determines effectiveness scores for the bucket roles. The effectiveness scores are measures of effectiveness of the bucket roles in identifying candidate data records that match to incoming data records. An effectiveness score for each bucket role can be determined. The effectiveness indicates how well, in general, the role is at identifying candidate records that are found to match to the subject incoming records to which they are compared during match processing runs.

In one example process for determining effectiveness scores, candidates are selected and match processing proceeds initially in the conventional manner where each of the selected candidates are processed against the incoming data record (e.g. case 1). This establishes some ground 'truths' about how good bucket role candidate selection is.

At some point, for each candidate data record found to match to an incoming data record, the process determines the hash and the hash type (e.g. bucket role) responsible for that candidate record to be selected as candidate. If that candidate record was a candidate in more than one bucket, then each bucket roll will receive credit for selecting that candidate. Then, for each bucket role, R and S values are calculated based on the results of match processing for one or more runs, e.g. one or more incoming data records that have already undergone match processing. R is defined as a ratio of Number of Matches to Number of Candidates, where the Number of Candidates is the number of candidates selected based on that bucket role (across the runs) and the Number of Matches is the number of those candidates that matched to the particular incoming data record being compared. Taking a very simple example in which two runs are performed to process two incoming records and the bucket role produces 8 candidates in the first run (2 of which match the first incoming data record) and 12 candidates in the second run (3 of which match the second incoming data record), then R=5:20=5/20=25%.

S is defined as a function (e.g. sum, average, etc.) of match scores for all the matches across the runs. Using the example above, in the first run, 2 of the 8 candidates match the incoming data record. There are approaches for determining a match score for each match. The match score is a score of the degree to which each of those 2 candidates match to the incoming data record. Some records can match better to an incoming record than other records. If the match scores for those two matches are 11 and 15, then the sum 26 of those scores is an example S value indicating how well the matches actually matched to the incoming record. S values across runs can be aggregated by averaging, summing, or any other approach to find an aggregate degree to which data records selected as candidates based on a given bucket role and found to be matching to incoming data records actually match those data records.

The bucket role effectiveness of a given bucket roll can be determined as a function of R, S, or both R and S, as examples. The function to determine effectiveness of the bucket role could be as straightforward as using R or S as a weight of the bucket role. Alternatively, this function could be more complex, determined through patterns recognized by machine learning models. Logarithmic, polynomial, or other mathematical functions could be empirically chosen and evaluated for what is most effective.

This quantized view of effectiveness of bucket-roles can be leveraged to influence candidate selection (which bucket roles to use for selection) and/or for candidate prioritization (which buckets to process first in the match processing). This can also be used for self-management of bucket roles, for instance to identify ineffective bucket roles and avoid using them or deprioritizing them when establishing the priority of the buckets of a candidate set.

In some examples, match processing can be parallelized by mapping a prioritized candidate list into N sub-lists to be concurrently processed and then their results merged. The match processing could include splitting at least a portion of the candidate data records (for instance the candidates in the highest-priority n bucket(s)) into multiple lists of candidate data records, processing the multiple lists of candidate data records in parallel to determine data records from each list of the lists that match to the incoming data record, and then grouping the matching data records from each list of the lists to obtain a list of data records matching to the incoming data record. This could be repeated for subsequent portions of the candidate pool, for instance the next highest prioritized bucket, and the results grouped into the initial group. An early-exit could be defined that applies to one or each iteration of the parallel processing.

FIGS. 3A-3B depict example results for candidate selection and match processing of the incoming data record of FIG. 2A using candidate prioritization in accordance with aspects described herein. Referring first to FIG. 3A, the table of FIG. 2A is presented but with added columns for Match per Candidate (the R values for the bucket roles) and Sum of Scores for Matched Parties (the S values for the bucket roles). The R values in this example are determined as the Number of Matches divided by the Number of Candidates. The Sum or Scores for Matched Parties was arbitrarily chosen for purposes of this example. The bucket effectiveness for each bucket role can be determined as a function of, e.g. the R and/or S values for that bucket role. As is seen in this example of FIG. 3A, the bucket role BR2 for Phone Number is clearly the most effective bucket role among the three bucket roles shown since, at least based on this single run, 20% of its candidates matched this incoming record and the match sum was 300—higher than that of the other bucket roles. Therefore, the candidate bucket corresponding to BR2 can be prioritized as the first candidate set to process, followed by the bucket corresponding to BR1 and then the bucket corresponding to BR3.

FIG. 3B depicts a case 3 for the scenario shown in FIG. 2B in which 100 candidates are processed but in which the process has established an order of priority in which to process the candidate data records in the match processing. This prioritizes the buckets into an order based on the effectiveness scores of their corresponding the bucket roles, for instance the buckets are prioritized in an order of descending effectiveness of their correlated bucket roles. In case 3, as shown in the Candidate List, bucket 204, the second bucket with 10 candidates C201-C210, is prioritized first, then bucket 202, the second bucket with 200 candidates C001-C200, is prioritized second, then bucket 206, the third bucket with 490 candidates C211-C700, is prioritized last. When only the first 100 candidate records are processed in the match processing, all 10 records of the second bucket (prioritized first for processing) and the first 90 records (202*a*) of the first bucket 202 (prioritized second for processing) are processed. The remaining portion (202*b*) of first bucket 202 is not processed.

Figure 4:
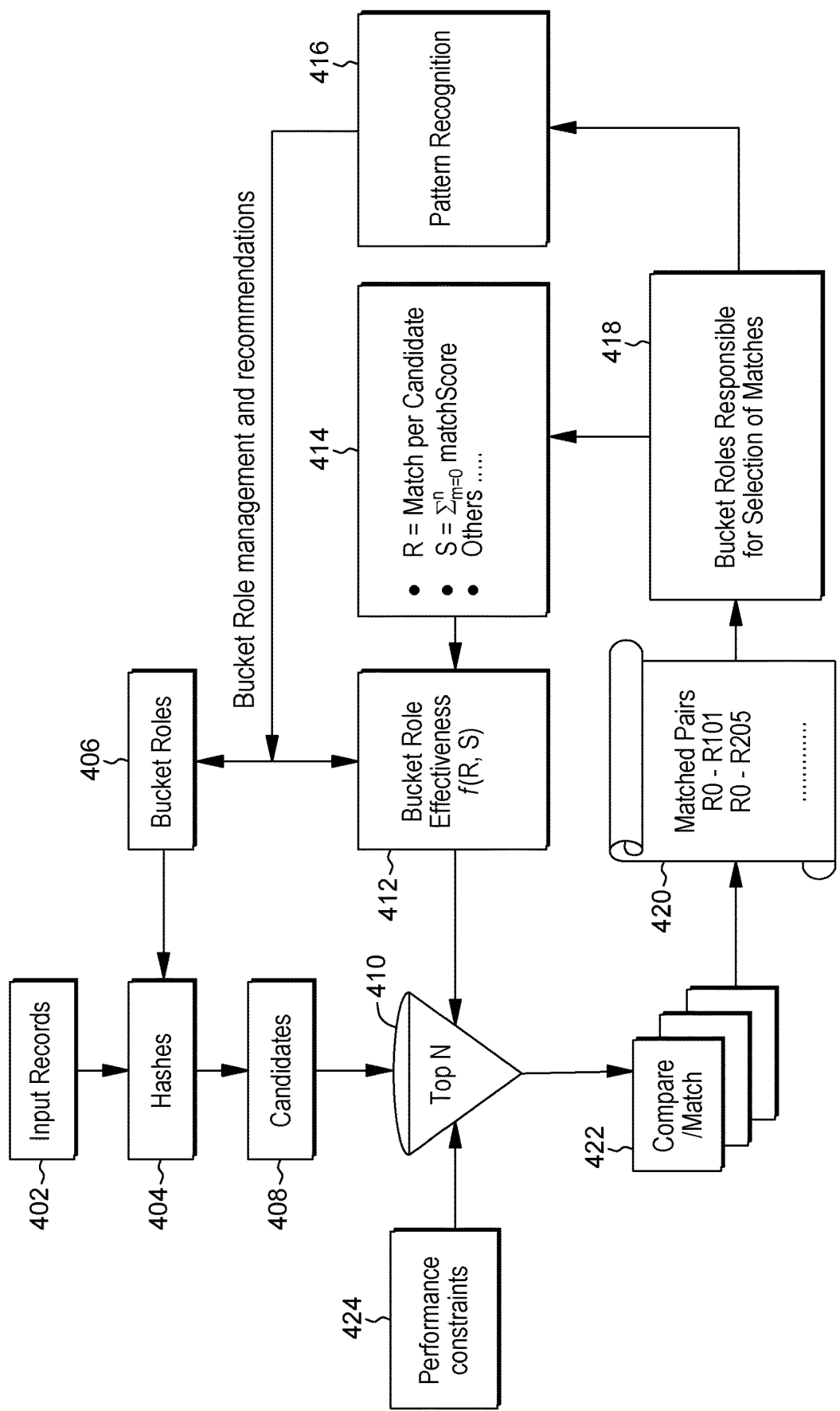
FIG. 4 depicts an example conceptual depiction of candidate data record prioritization for match processing, in accordance with aspects described herein.

FIG. 4 depicts an example conceptual depiction of candidate data record prioritization for match processing, in accordance with aspects described herein. In some examples, one or more processes executing on one or more computer systems perform aspects of FIG. 4. Input records 402 are received and hashes 404 are determined based on bucket roles 406 defined in the system. Example data record data is shown in the Data column of FIG. 2A, and example hashes for that data are shown in the Bucket Hash column of FIG. 2A. Continuing with FIG. 4, the hashes are used to identify/select candidates 408 from the dataset/database (not shown). In accordance with aspects described herein, an order of priority in which to process candidate data records in the match processing is established to inform the top N records 410 for match processing. As part of this, the buckets of candidates 408 are prioritized into an order based on the effectiveness scores for the bucket roles corresponding to those buckets. In an example, the buckets are ordered in descending effectiveness of their correlated bucket role, to thereby place sets of candidates at higher priority than other sets of candidates. The Candidate List of FIG. 3B illustrates an example of this prioritization. As described herein, bucket role effectiveness scores 412 informs this prioritization. Performance constraints 424 can also influence what is identified as the top N records to process. The process can receive performance constraint(s) on the match processing, which constraint(s) indicate threshold(s) at which the match processing is to early-exit, i.e. prior to processing all of the candidates 408. The performance constraints can define the point of early-exit. Example performance constraints are: a total number of candidates to be processed, a maximum runtime of match processing (e.g. 1000 ms as in FIG. 3B, correlating to 100 candidates), and a latest response time by which a response with the matches is to be provided, though many others are possible. In some examples, the number of candidate data records that is processed is fewer than the number of candidate data records in the highest-priority bucket.

Advantageously, prioritizing the buckets enables this early-exit/thresholding to be applied while maintaining confidence in the quality of the results because the candidates most statistically likely to be the best matches have been frontloaded to the beginning of the list. That is, because of the prioritization, the match process is statistically less likely to find more or better matches as it progresses through the list in the established order of priority. In some examples, this is used in conjunction with approach(es) for prioritizing candidates within a single bucket to further prioritize candidates within the candidate list for processing.

Continuing with FIG. 4, the compare/match processing 422 proceeds against the top N records 410 for match processing. That is, match processing is commenced to process the candidate data records in the established order of priority for processing the candidate data records. Of course, an early-exit might cause a break from this processing before all candidates have been processed.

In any event, the match processing 424 produces a list 420 of matched pairs (RO indicating the incoming data record). Then in accordance with aspects described herein, the process determines the bucket roles 418 responsible for selecting those matched candidates. R and S scores (and any other measures) are determined at 414, and these inform the bucket role effectiveness 412 as described. Using the example described above, from past learning BR2 is found most effective, followed by BR1 then BR3. That is why in this example a priority adjustment from 412 to 410 is made to prioritized BR2 before BR1.

Meanwhile, in accordance with additional aspects, pattern recognition and/or machine learning 416 leverages the information about which bucket roles were responsible for selecting matching candidates. This informs bucket role management and recommendations, for instance the removal of ineffective bucket roles from 406, which attributes are used in the most effective bucket roles, etc.

Figure 5:
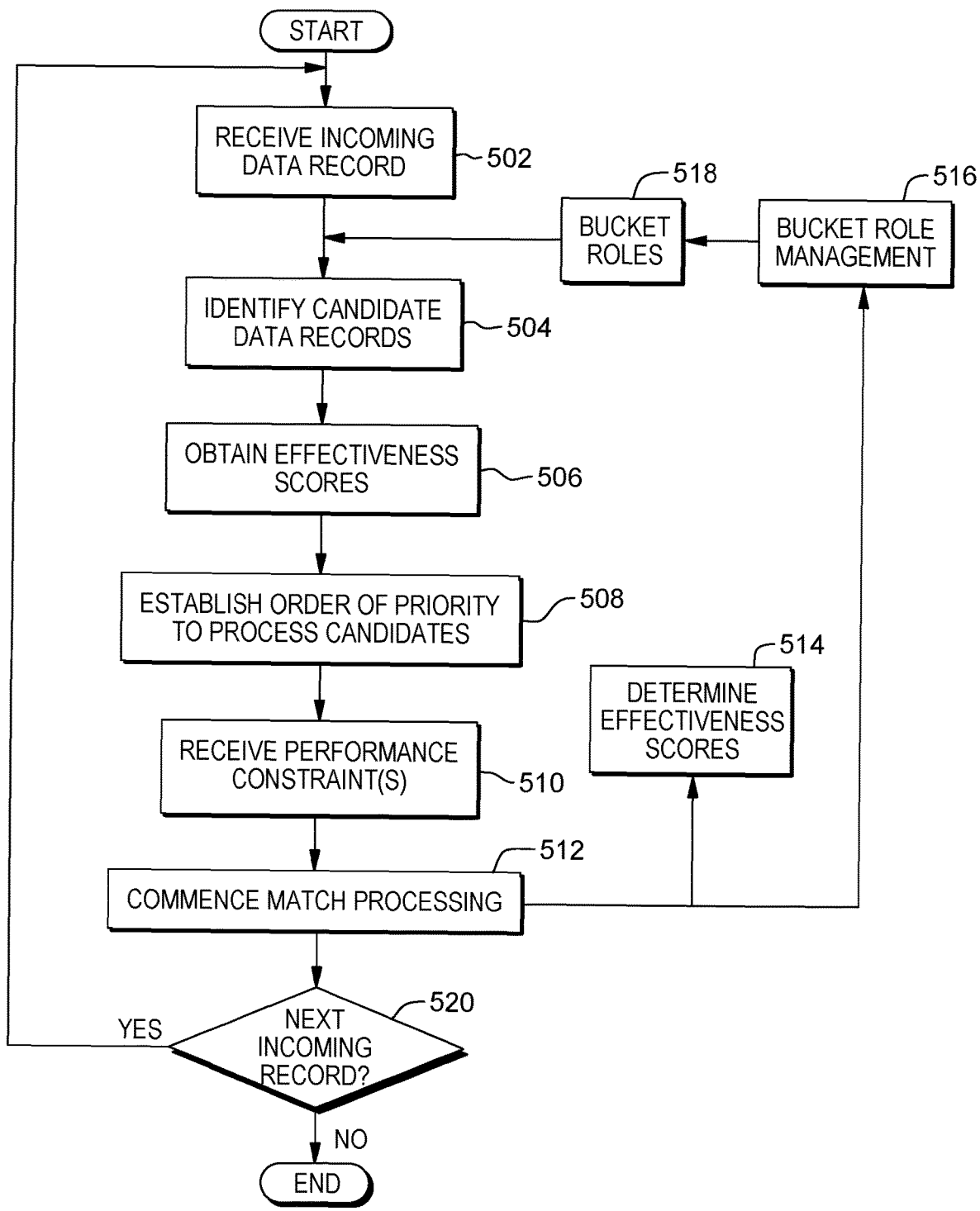
FIG. 5 depicts an example process for candidate data record prioritization for match processing, in accordance with aspects described herein.

Accordingly, FIG. 5 depicts an example process for candidate data record prioritization for match processing, in accordance with aspects described herein. In some examples, the process is performed by one or more computer systems, such as those described herein, which may include one or more computer systems of or in communication with a master data management system, and/or one or more other computer systems. The process begins with receipt (502) of an incoming data record and proceeds to identify (504), from a dataset, candidate data records to be used in match processing. Match processing refers to the process of comparing the incoming record to candidates to determine candidate data records that match to the incoming data record. The candidate data records identified at 504 are grouped into a plurality of buckets according to bucket roles 518. Each bucket correlates to a bucket role of the bucket roles, and each bucket role of the bucket roles is defined by a unique record attribute set.

The process obtains (506) effectiveness scores for the bucket roles. The effectiveness scores are measures of effectiveness of the bucket roles in identifying candidate data records that match to incoming data records. Each effectiveness score of the effectiveness scores can define a weight of a bucket that correlates to the bucket role having that effectiveness score. Prioritizing the buckets (see 508) can order the buckets of in descending weight of those buckets, for instance.

The process proceeds by establishing (508) an order of priority in which to process the candidate data records in the match processing. Establishing the order of priority includes prioritizing the plurality of buckets into an order based on the effectiveness scores for the bucket roles. In an example, the plurality of buckets are prioritized in an order of descending effectiveness of their correlated bucket roles.

The process also receives (510) performance constraint(s) on the match processing to be performed. A performance constraint can indicate a threshold at which the match processing may early-exit prior to processing all of the candidate data records identified at 504. For instance, the threshold identifies a number of candidate data records to process, and the match processing (commenced in 512) processes that number of candidate data records in the established order of priority and then early-exits. In some examples, the number of candidate data records processed before the early-exit exist the match processing is fewer than a number of candidate data records in the highest-priority bucket of the plurality of buckets.

With the order of priority from 508 and any user-provided or system-defined constraints received at 510, the process continues by commencing (512) the match processing to process the candidate data records in the established order of priority for processing the candidate data records. The match processing processes candidate data records of a higher priority bucket before processing candidate data records of a lower priority bucket on the basis of prioritization at 508, and, based on the constraint(s), may early-exit before all candidates are processed.

In a particular example of match processing, the match processing splits at least a portion of the candidate data records into multiple lists of candidate data records, processes the multiple lists of candidate data records in parallel to determine data records from each list of the lists that match to the incoming data record, and then groups matching data records from each list of the lists to obtain a list of data records matching to the incoming data record.

The results of the match processing performed at 512 are used in determining (514) effectiveness scores for the bucket roles, which includes determining a respective effectiveness score for each bucket role of the collection 5158 of bucket roles of which the plurality of bucket roles (for the candidate selection at 504) are a part. In some examples, the effectiveness score of each bucket role is determined as a function of at least a ratio between a number of candidates selected based on that bucket role and a number of those candidates that match to incoming data records. Additionally or alternatively, in examples the effectiveness score of a bucket role is determined as a function of at least an aggregate degree to which data records selected as candidates based on that bucket role and found to be matching to incoming data records match to those incoming data records.

Results of the match processing can also be provided for bucket role management (516), for instance identifying and removing one or more bucket roles from the collection 518 of bucket roles based on, e.g. pattern matching, machine learning, and/or the effectiveness scores of those identified and removed one or more bucket roles. In some examples, machine learning learns which data record attributes contribute most to bucket role effectiveness in identifying candidate data records that match to incoming data records and can convey this to an administrator and/or refine the bucket roles 514 as desired.

Bucket role management and effectiveness score determination is an ongoing process as additional incoming data records are processed. Thus, the process of FIG. 5 determines (520) whether there is a next incoming data record to be matched against the database. If so (520, Y) the process returns to 502, otherwise the process ends (or temporarily halts waiting for a next incoming data record).

Although various examples are provided, variations are possible without departing from a spirit of the claimed aspects.

Figure 6:
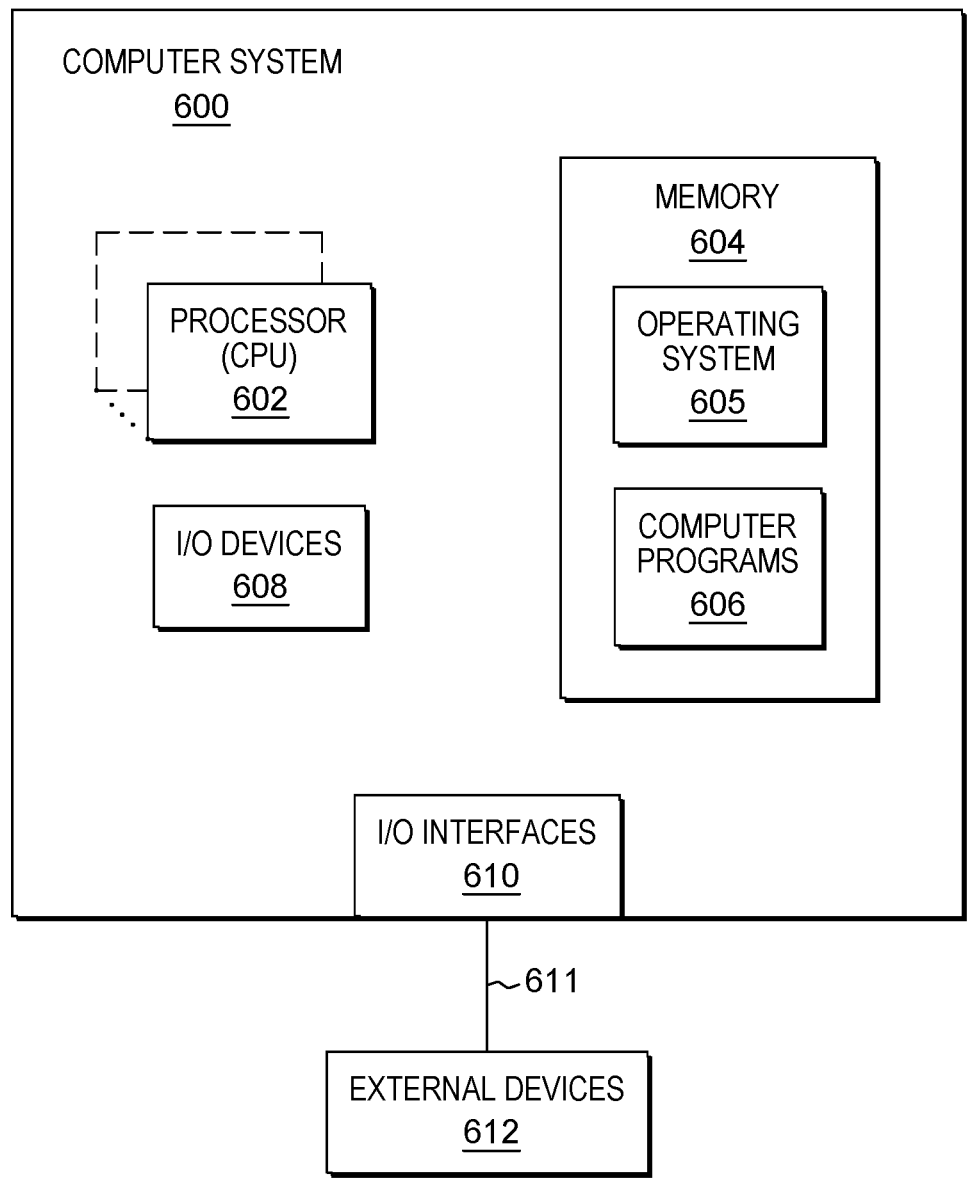
FIG. 6 depicts one example of a computer system and associated devices to incorporate and/or use aspects described herein.

Processes described herein may be performed singly or collectively by one or more computer systems, such as one or more computer systems of an MDM system, as an example. FIG. 6 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 6 shows a computer system 600 in communication with external device(s) 612. Computer system 600 includes one or more processor(s) 602, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 602 can also include register(s) to be used by one or more of the functional components. Computer system 600 also includes memory 604, input/output (I/O) devices 608, and I/O interfaces 610, which may be coupled to processor(s) 602 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 604 can be or include main or system memory (e.g. Random Access Memory) used in the execution of program instructions, storage device(s) such as hard drive(s), flash media, or optical media as examples, and/or cache memory, as examples. Memory 604 can include, for instance, a cache, such as a shared cache, which may be coupled to local caches (examples include L1 cache, L2 cache, etc.) of processor(s) 602. Additionally, memory 604 may be or include at least one computer program product having a set (e.g., at least one) of program modules, instructions, code or the like that is/are configured to carry out functions of embodiments described herein when executed by one or more processors.

Memory 604 can store an operating system 605 and other computer programs 606, such as one or more computer programs/applications that execute to perform aspects described herein. Specifically, programs/applications can include computer readable program instructions that may be configured to carry out functions of embodiments of aspects described herein.

Examples of I/O devices 608 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (612) coupled to the computer system through one or more I/O interfaces 610.

Computer system 600 may communicate with one or more external devices 612 via one or more I/O interfaces 610. Example external devices include a keyboard, a pointing device, a display, and/or any other devices that enable a user to interact with computer system 600. Other example external devices include any device that enables computer system 600 to communicate with one or more other computing systems or peripheral devices such as a printer. A network interface/adapter is an example I/O interface that enables computer system 600 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 610 and external devices 612 can occur across wired and/or wireless communications link(s) 611, such as Ethernet-based wired or wireless connections. Example wireless connections include cellular, Wi-Fi, Bluetooth®, proximity-based, near-field, or other types of wireless connections. More generally, communications link(s) 611 may be any appropriate wireless and/or wired communication link(s) for communicating data.

Particular external device(s) 612 may include one or more data storage devices, which may store one or more programs, one or more computer readable program instructions, and/or data, etc. Computer system 600 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 600 may be operational with numerous other general purpose or special purpose computing system environments or configurations. Computer system 600 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
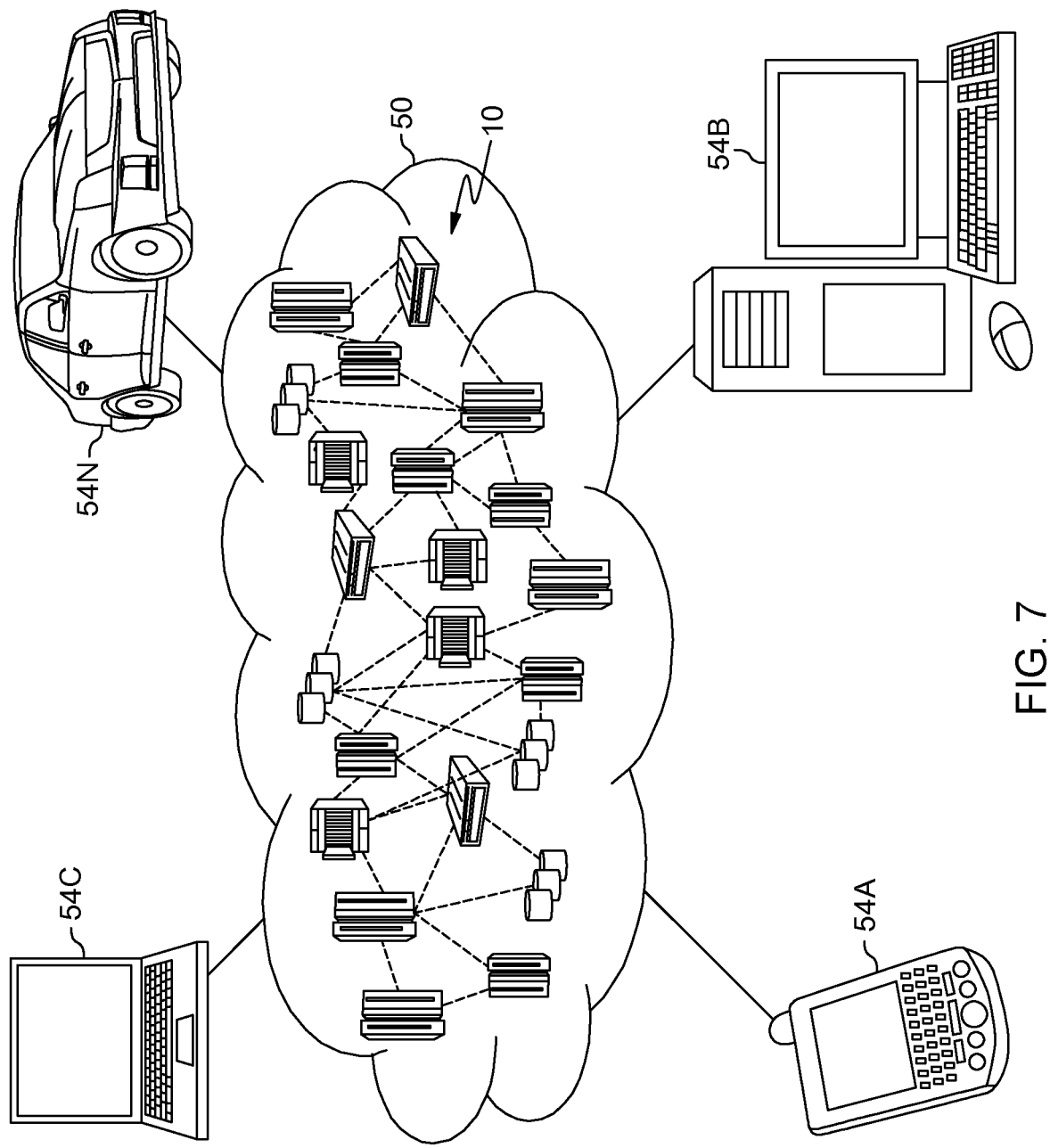
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
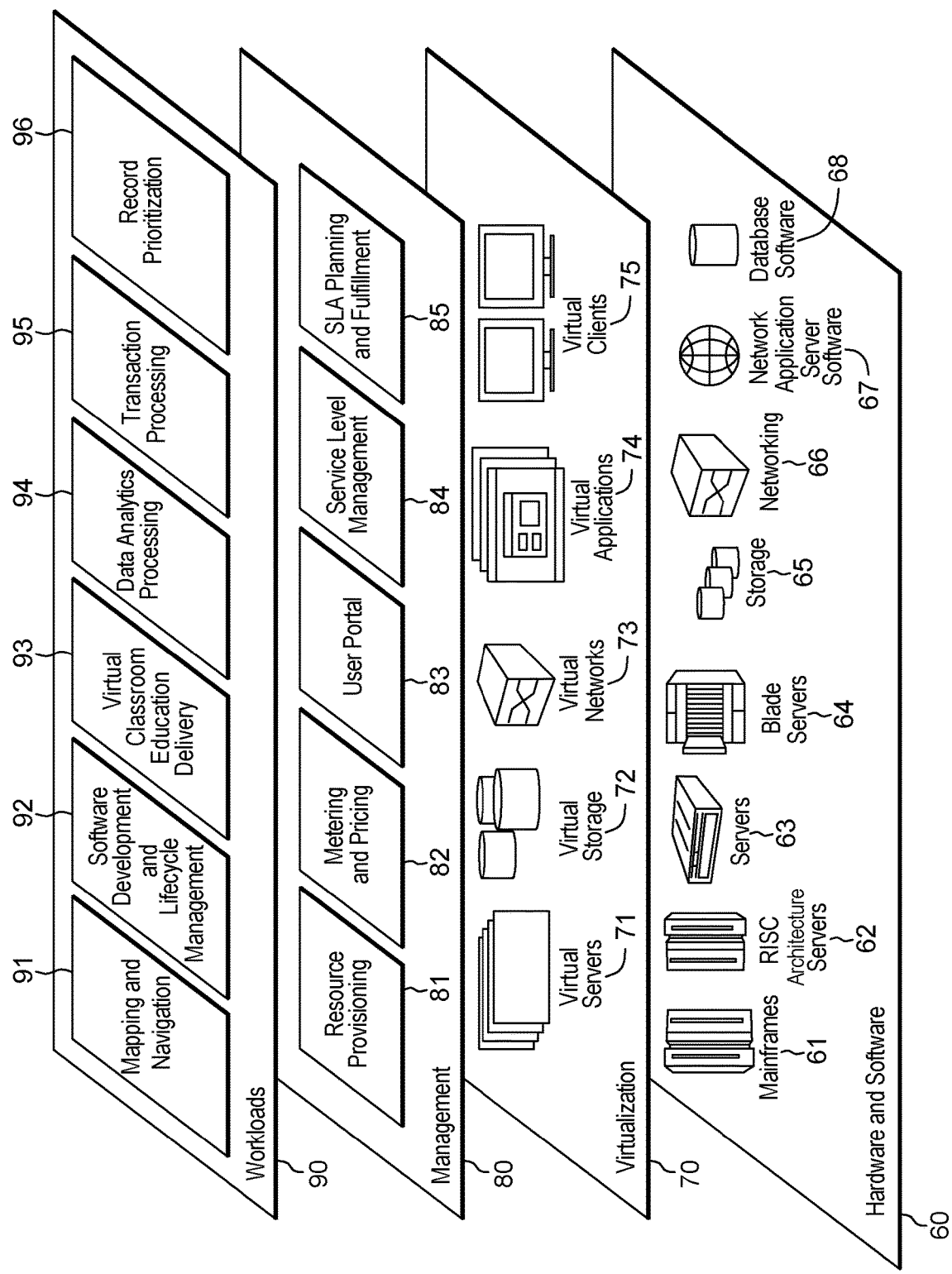
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and candidate data record prioritization 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   identifying candidate data records to be used in match processing, the identified candidate data records being from a dataset of data records representing different entities, and the match processing being to determine any of the identified candidate data records, that represent an entity that is a same entity represented by an incoming data record, and therefore that match to the incoming data record, for consolidation of data as between the incoming data record and matching data records of the identified candidate data records to form master data that represents that entity, the identified candidate data records being grouped into a plurality of buckets according to bucket roles, wherein each bucket correlates to a bucket role of the bucket roles, and wherein each bucket role of the bucket roles is defined by a unique record attribute set;
   obtaining effectiveness scores for the bucket roles, the effectiveness scores being measures of effectiveness of the bucket roles in identifying data records that match to incoming data records;
   using a machine learning model to determine data record attributes contributing most to the effectiveness of the bucket roles in identifying data records that match to incoming data records;
   establishing an order of priority in which to process the identified candidate data records in the match processing, the establishing the order of priority comprising prioritizing the plurality of buckets into an order based on the effectiveness scores of the bucket roles, wherein the plurality of buckets are prioritized in an order of descending effectiveness of their correlated bucket roles;
   commencing the match processing to process the identified candidate data records in the established order of priority for processing the identified candidate data records, in which the match processing processes candidate data records, of the identified candidate data records, of a higher priority bucket before processing candidate data records, of the identified candidate data records, of a lower priority bucket;
   based on determining one or more data records of the identified candidate data records that match to the incoming data record, consolidating data of the incoming data record and data of the one or more data records matching to the incoming data record to produce and store a master data record representing that entity; and
   managing the bucket roles based on feedback as to which bucket roles provide data records that match to the incoming data records, the managing comprising further training the machine learning model, using the feedback to determine data record attributes contributing most to the effectiveness of the bucket roles, and updating the bucket roles based on the further training and the determined data record attributes contributing most to the effectiveness of the bucket roles.

2. The method of claim 1, further comprising determining the effectiveness scores of the bucket roles, the determining the effectiveness scores comprising determining a respective effectiveness score for each bucket role of a collection of bucket roles of which the bucket roles are a part.

3. The method of claim 2, wherein the effectiveness score of a bucket role is determined as a function of at least a ratio between a number of candidates selected based on that bucket role and a number of those candidates that match to processed incoming data records.

4. The method of claim 2, wherein the effectiveness score of a bucket role is determined as a function of at least an aggregate degree to which candidates selected based on that bucket role and found to be matching to processed incoming data records match to those processed incoming data records.

5. The method of claim 2, wherein the updating the bucket roles comprises identifying and removing one or more of the bucket roles based on the effectiveness scores of those identified and removed one or more of the bucket roles.

6. The method of claim 2, wherein the machine learning model suggests attributes for possible definition of one or more new bucket roles to add to the bucket roles.

7. The method of claim 1, further comprising receiving a performance constraint on the match processing, the performance constraint indicating a threshold at which the match processing is to early-exit prior to processing all of the identified candidate data records.

8. The method of claim 7, wherein the threshold identifies a number of the identified candidate data records to process, wherein the match processing processes that number of identified candidate data records in the established order of priority and then early-exits.

9. The method of claim 8, wherein the number of identified candidate data records is fewer than a number of identified candidate data records in the highest-priority bucket of the plurality of buckets.

10. The method of claim 1, wherein each effectiveness score of the effectiveness scores defines a weight of a bucket, of the plurality of buckets, correlating to the bucket role having that effectiveness score, and wherein the prioritizing the plurality of buckets orders the buckets of the plurality of buckets in descending weight of those buckets.

11. The method of claim 1, wherein the match processing comprises:
splitting at least a portion of the identified candidate data records into multiple lists of incoming candidate data records;
processing the multiple lists of incoming candidate data records in parallel to determine data records from each list of the lists that match to the incoming data record; and
grouping matching data records from each list of the lists to obtain a list of data records matching to the incoming data record.

12. A computer system comprising:
a memory; and
a processor in communication with the memory, wherein the computer system is configured to perform a method comprising:
identifying candidate data records to be used in match processing, the identified candidate data records being from a dataset of data records representing different entities, and the match processing being to determine any of the identified candidate data records, that represent an entity that is a same entity represented by an incoming data record, and therefore that match to the incoming data record, for consolidation of data as between the incoming data record and matching data records of the identified candidate data records to form master data that represents that entity, the identified candidate data records being grouped into a plurality of buckets according to bucket roles, wherein each bucket correlates to a bucket role of the bucket roles, and wherein each bucket role of the bucket roles is defined by a unique record attribute set;
obtaining effectiveness scores for the bucket roles, the effectiveness scores being measures of effectiveness of the bucket roles in identifying data records that match to incoming data records;
using a machine learning model to determine data record attributes contributing most to the effectiveness of the bucket roles in identifying data records that match to incoming data records;
establishing an order of priority in which to process the identified candidate data records in the match processing, the establishing the order of priority comprising prioritizing the plurality of buckets into an order based on the effectiveness scores of the bucket roles, wherein the plurality of buckets are prioritized in an order of descending effectiveness of their correlated bucket roles;
commencing the match processing to process the identified candidate data records in the established order of priority for processing the identified candidate data records, in which the match processing processes candidate data records, of the identified candidate data records, of a higher priority bucket before processing candidate data records, of the identified candidate data records, of a lower priority bucket;
based on determining one or more data records of the identified candidate data records that match to the incoming data record, consolidating data of the incoming data record and data of the one or more data records matching to the incoming data record to produce and store a master data record representing that entity; and
managing the bucket roles based on feedback as to which bucket roles provide data records that match to the incoming data records, the managing comprising further training the machine learning model, using the feedback to determine data record attributes contributing most to the effectiveness of the bucket roles, and updating the bucket roles based on the further training and the determined data record attributes contributing most to the effectiveness of the bucket roles.

13. The computer system of claim 12, wherein the method further comprises determining the effectiveness scores of the bucket roles, the determining the effectiveness scores comprising determining a respective effectiveness score for each bucket role of a collection of bucket roles of which the bucket roles are a part.

14. The computer system of claim 13, wherein the effectiveness score of a bucket role is determined as a function of at least one selected from the group consisting of: (i) a ratio between a number of candidates selected based on that bucket role and a number of those candidates that match to processed incoming data records, and (ii) an aggregate degree to which candidates selected based on that bucket role and found to be matching to processed incoming data records match to those processed incoming data records.

15. The computer system of claim 13, wherein the machine learning model suggests attributes for possible definition of one or more new bucket roles to add to the bucket roles.

16. The computer system of claim 12, wherein the method further comprises receiving a performance constraint on the match processing, the performance constraint indicating a threshold at which the match processing is to early-exit prior to processing all of the identified candidate data records.

17. A computer program product comprising:
a non-transitory computer readable storage medium readable by a processing circuit and storing instructions for execution by the processing circuit for performing a method comprising:
identifying candidate data records to be used in match processing, the identified candidate data records being from a dataset of data records representing different entities, and the match processing being to determine any of the identified candidate data records that represent an entity that is a same entity represented by an incoming data record, and therefore that match to the incoming data record, for consolidation of data as between the incoming data record and matching data records of the identified candidate data records to form master data that represents that entity, the identified candidate data records being grouped into a plurality of buckets according to bucket roles, wherein each bucket correlates to a bucket role of the bucket roles, and wherein each bucket role of the bucket roles is defined by a unique record attribute set;
obtaining effectiveness scores for the bucket roles, the effectiveness scores being measures of effectiveness of the bucket roles in identifying data records that match to incoming data records;
using a machine learning model to determine data record attributes contributing most to the effectiveness of the bucket roles in identifying data records that match to incoming data records;
establishing an order of priority in which to process the identified candidate data records in the match processing, the establishing the order of priority comprising prioritizing the plurality of buckets into an order based on the effectiveness scores of the bucket roles, wherein the plurality of buckets are prioritized in an order of descending effectiveness of their correlated bucket roles;
commencing the match processing to process the identified candidate data records in the established order of priority for processing the identified candidate data records, in which the match processing processes candidate data records, of the identified candidate data records, of a higher priority bucket before processing candidate data records, of the identified candidate data records, of a lower priority bucket;
based on determining one or more data records of the identified candidate data records that match to the incoming data record, consolidating data of the incoming data record and data of the one or more data records matching to the incoming data record to produce and store a master data record representing that entity; and
managing the bucket roles based on feedback as to which bucket roles provide data records that match to the incoming data records, the managing comprising further training the machine learning model, using the feedback to determine data record attributes contributing most to the effectiveness of the bucket roles, and updating the bucket roles based on the further training and the determined data record attributes contributing most to the effectiveness of the bucket roles.

18. The computer program product of claim 17, wherein the method further comprises determining the effectiveness scores of the bucket roles, the determining the effectiveness scores comprising determining a respective effectiveness score for each bucket role of a collection of bucket roles of which the bucket roles are a part, wherein the effectiveness score of a bucket role is determined as a function of at least one selected from the group consisting of: (i) a ratio between a number of candidates selected based on that bucket role and a number of those candidates that match to processed incoming data records, and (ii) an aggregate degree to which candidates selected based on that bucket role and found to be matching to processed incoming data records match to those processed incoming data records.

19. The computer program product of claim 18, wherein the machine learning model suggests attributes for possible definition of one or more new bucket roles to add to the bucket roles.

20. The computer program product of claim 17, wherein the method further comprises receiving a performance constraint on the match processing, the performance constraint indicating a threshold at which the match processing is to early-exit prior to processing all of the identified candidate data records.

* * * * *